United States Patent
Chang et al.

(10) Patent No.: US 7,738,718 B2
(45) Date of Patent: Jun. 15, 2010

(54) BLOCK DECODING METHOD AND APPARATUS CAPABLE OF DECODING AND OUTPUTTING DATA IN A LONGITUDINAL DIRECTION

(75) Inventors: Jyh-Kai Chang, Sanchong (TW); Wen-Cheng Ho, Shigang Shiang (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 844 days.

(21) Appl. No.: 11/643,829

(22) Filed: Dec. 22, 2006

(65) Prior Publication Data
US 2007/0147694 A1 Jun. 28, 2007

(30) Foreign Application Priority Data
Dec. 22, 2005 (TW) .............................. 94145785 A

(51) Int. Cl.
G06K 9/36 (2006.01)
G06K 9/32 (2006.01)
(52) U.S. Cl. .................... 382/250; 382/233; 382/296
(58) Field of Classification Search ......... 382/232–253, 382/166, 276, 295–300; 375/240.01–240.27; 708/203, 400–405; 348/395.1, 400.1, 420.1; 358/539, 1.9, 426.01–426.16
See application file for complete search history.

(56) References Cited

U.S. PATENT DOCUMENTS

| | | | | |
|---|---|---|---|---|
| 5,867,598 A * | 2/1999 | de Queiroz | ................. | 382/235 |
| 6,298,166 B1 * | 10/2001 | Ratnakar et al. | ............ | 382/248 |
| 6,442,302 B2 * | 8/2002 | Klassen | ...................... | 382/296 |
| 6,674,910 B1 * | 1/2004 | Moon et al. | ................. | 382/239 |
| 6,941,019 B1 * | 9/2005 | Mitchell et al. | ............. | 382/232 |
| 7,352,904 B2 * | 4/2008 | Keng et al. | ................... | 382/233 |
| 7,643,694 B2 * | 1/2010 | Srinidhi | ..................... | 382/250 |
| 2007/0165955 A1 * | 7/2007 | Hwang et al. | ............... | 382/232 |

* cited by examiner

Primary Examiner—Sherali Ishrat
(74) Attorney, Agent, or Firm—Bacon & Thomas, PLLC

(57) ABSTRACT

A block decoding method and apparatus capable of decoding and outputting data in a longitudinal direction, which scans a compressed datastream and accordingly obtains a start address in the compressed datastream for each MCUR of a decompressed image, such that the apparatus can obtain blocks rotated with 90 degrees by performing a Huffman decoding in a longitudinal direction, a de-zigzag arrangement, an inverse quantization, an IDCT and a rotation. Since the decoding direction is identical to the output direction of a printer, only a desired column of data in the decompressed image is temporarily stored for output and accordingly the required memory size is relatively reduced.

12 Claims, 10 Drawing Sheets

| 16 | 11 | 10 | 16 | 24 | 40 | 51 | 61 |
|---|---|---|---|---|---|---|---|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 39 | 64 | 78 | 87 | 103 | 121 | 120 | 101 |
| 72 | 92 | 95 | 98 | 112 | 100 | 103 | 99 |

| DC1, DC2, DC3, DC4 | MCUR1 Start Address | DC1, DC2, DC3, DC4 | MCUR2 Start Address |
|---|---|---|---|

Image Processing
0° Rotation

Memory Arrangement

BLOCK DECODING METHOD AND APPARATUS CAPABLE OF DECODING AND OUTPUTTING DATA IN A LONGITUDINAL DIRECTION

BACKGROUND OF THE INVENTION

1. Field of the Invention

The invention relates to a block decoding method and apparatus and, more particularly, to a block decoding method and apparatus capable of decoding and outputting data in a longitudinal direction.

2. Description of Related Art

Block decoding is an image compressing/decompressing technique, and JPEG decoding is one of the most popular block decoding schemes. FIG. 1 is a block diagram of a JPEG decoder 10. As shown in FIG. 1, the JPEG decoder 10 is essentially constructed by a decoding device 110, a de-zigzag arranging device 120, an inverse quantizer 130, an inverse discrete cosine transform (IDCT) device 140, a color space converter 150, a controller 160 and a memory device 170, thereby decoding a JPEG compressed image file 100 in which table data 102 and format data 103 that are associated with a compressed data datastream 101 thereof are provided. The table data 102 includes a Huffman coding table 111 and an inverse quantization table 131 such that the decoding device 110 can perform a Huffman decoding on the compressed datastream 101 in accordance with the Huffman coding table 111 when the JPEG decoder 10 decodes the compressed image file 100 to thus obtain an one-dimensional block consisting of pixels arranged in one dimension. In accordance with the JPEG standard, the de-zigzag arranging device 120 arranges the one-dimensional block into a two-dimensional block consisting of pixels arranged in two dimensions. As shown in FIG. 2, the arrows direct the sequence of pixel arrangement from the one-dimensional block to the two-dimensional block. Namely, the pixels are arranged in a directional sequence: transverse (right), diagonal (left-down), down, diagonal (right-up) and so on.

The inverse quantizer 130 performs inverse quantization on the two-dimensional block in accordance with the inverse quantization table 131 to thus obtain a two-dimensional inverse quantization block. FIG. 3 is an example of a content of the inverse quantization table 131. The IDCT device 140 converts the two-dimensional inverse quantization block from frequency domain to spatial domain. The color space converter 150 performs color conversion on the two-dimensional spatial block to thus convert its YCbCr format into a RGB format, thereby obtaining a decompressed image block similar to its source image.

The controller 160 controls the entire JPEG decoding to obtain an RGB decompressed image 200, and performs an initialization and setting on the internal registers of the devices 110, 120, 130, 140 and 150. The memory device 170 temporarily stores the JPEG compressed image file 100 and the decompressed image 200.

As cited, the JPEG decoder 10 requires sequentially decoding the blocks of the compressed datastream 101 first and then re-combines them into the complete decompressed image 200. For example, as to the decompressed image 200 represented by the picture shown in FIG. 4, the JPEG decoder 10 sequentially decodes each block 41 in a direction A (horizontal). When printing the decompressed image 200, a typical printer feeds paper in a B direction and fetches each block 41 of the decompressed image 200 in a direction C (longitudinal). Accordingly, it is seen that the JPEG decoder 10 decodes the compressed datastream 101 for obtaining every block 41 and storing them to the memory device 170 first and then fetches the decompressed image 200 in the direction C for printing it out. However, the memory device 170 is increased with higher image resolution for storing more data. For an example of the decompressed image 200 with ((M+1)×(N+1)) blocks, if every block has red, green and blue colors and requires a memory space of 8×8×3 bytes, the size of the memory device 170 required by the JPEG decoder 10 is up to ((M+1)×(N+1)×64×3) bytes, which needs a very high hardware cost.

To overcome this problem, U.S. Pat. No. 6,298,166 granted to Ratnakar, et al. for an "Image transformations in the compressed domain" records additional information about compressed blocks along with coding and compressing. However, the additional information including indexes of the compressed blocks is not necessary in the JPEG standard but provided for a special JPEG decoder. In accordance with the additional information, the JPEG decoder can decode data in the longitudinal direction and output a re-arranged and re-compressed JPEG file based on a requirement of image rotation and mirror. Such a technique requires the additional processes in coding and compressing, and this system is suitable to implement the functions of rotation and mirror in a digital image input system because it does not teach or disclose any longitudinal processing for a non-digital image input system. In addition, Ratnakar discloses the processing of image mirror and rotation in frequency domain, not in spatial domain. Further, the processing of image mirror and rotation in frequency domain tends to a theoretical study rather than implement in practice. Therefore, it is desirable to provide an improved block decoding method and apparatus to mitigate and/or obviate the aforementioned problems.

SUMMARY OF THE INVENTION

The object of the invention is to provide a block decoding method and apparatus capable of decoding and outputting data in a longitudinal direction, which can save the size of data buffer and the required cost. Also, JPEG horizontal and longitudinal block decoding can be achieved by the JPEG decoder structure with only a minor change, without using any special compression format or being limited in a digital image input system only.

In accordance with one aspect of the invention, there is provided a block decoding method capable of decoding and outputting data in a longitudinal direction, which decodes an input compressed datastream to obtain a decompressed image with a plurality of blocks in rows and columns, each block consisting of pixels in a two-dimensional arrangement, and every K (an integer greater than one) blocks forming a minimum code unit row (MCUR). The method includes: a scanning step, a decoding step, a de-zigzag arranging step, an inverse quantizing step, an inverse discrete cosine transform (IDCT) step and a rotating step. The scanning step scans the compressed datastream to thus obtain a start address in the compressed datastream for each MCUR and direct current (DC) values corresponding to the K blocks of the MCUR. The decoding step longitudinally performs a Huffman decoding on the blocks in accordance with the start address of a MCUR, thereby obtaining frequency values corresponding to the K blocks of the MCUR. The de-zigzag arranging step re-arranges the frequency values into a de-zigzag sequence. The inverse quantizing step performs an inverse quantization operation on the frequency values in accordance with the inverse quantization table. The IDCT step converts the frequency values of the K blocks from frequency domain to spatial domain after the inverse quantization operation to thus obtain spatial domain coefficients corresponding to the K blocks of the MCUR. The rotating step performs a rotation operation on the spatial domain coefficients.

In accordance with another aspect of the invention, there is provided a block decoding apparatus capable of decoding and outputting data in a longitudinal direction, which decodes an input compressed datastream to obtain a decompressed data with a plurality of blocks in rows and columns, each block consisting of pixels in a two-dimensional arrangement, and every K (an integer greater than one) blocks forming a minimum code unit row (MCUR). The block decoding apparatus includes a memory device, a decoding device, a controller, a de-zigzag arranging device, an inverse quantizer, an inverse discrete cosine transform (IDCT) device and a rotator. The memory stores the compressed datastream. The decoding device is connected to the memory device in order to receive and scan the compressed datastream to thus obtain a start address in the compressed datastream for each MCUR and direct current (DC) values corresponding to the K blocks of the MCUR, which are stored in the memory device. The controller is connected to the memory device in order to longitudinally perform a Huffman decoding on the K blocks of the MCUR in accordance with the start address and the DC values stored, thereby obtaining frequency values corresponding to the K blocks of the MCUR and storing the frequency values obtained in the memory device. The de-zigzag arranging device is connected to the decoding device and the memory device in order to re-arrange the frequency values into a de-zigzag sequence. The inverse quantizer is connected to the de-zigzag arranging device in order to perform an inverse quantization operation on the frequency values in accordance with the inverse quantization table. The IDCT device is connected to the inverse quantizing device in order to convert the frequency values of the K blocks of the MCUR from frequency to spatial domain after the inverse quantization operation to thus obtain spatial domain coefficients corresponding to the K blocks of the MCUR. The rotator is connected to the IDCT device and the memory device in order to perform a rotation operation first and then an up-sampling operation on the spatial domain coefficients.

Other objects, advantages, and novel features of the invention will become more apparent from the following detailed description when taken in conjunction with the accompanying drawings.

BRIEF DESCRIPTION OF THE DRAWINGS

FIG. 9 is a schematic view of a scan table of 4:2:0 compression format in accordance with the invention;

FIG. 10 is a schematic view of a zero-degree rotation operation performed by a rotator in accordance with the invention;

DETAILED DESCRIPTION OF THE PREFERRED EMBODIMENT

Figure 5:
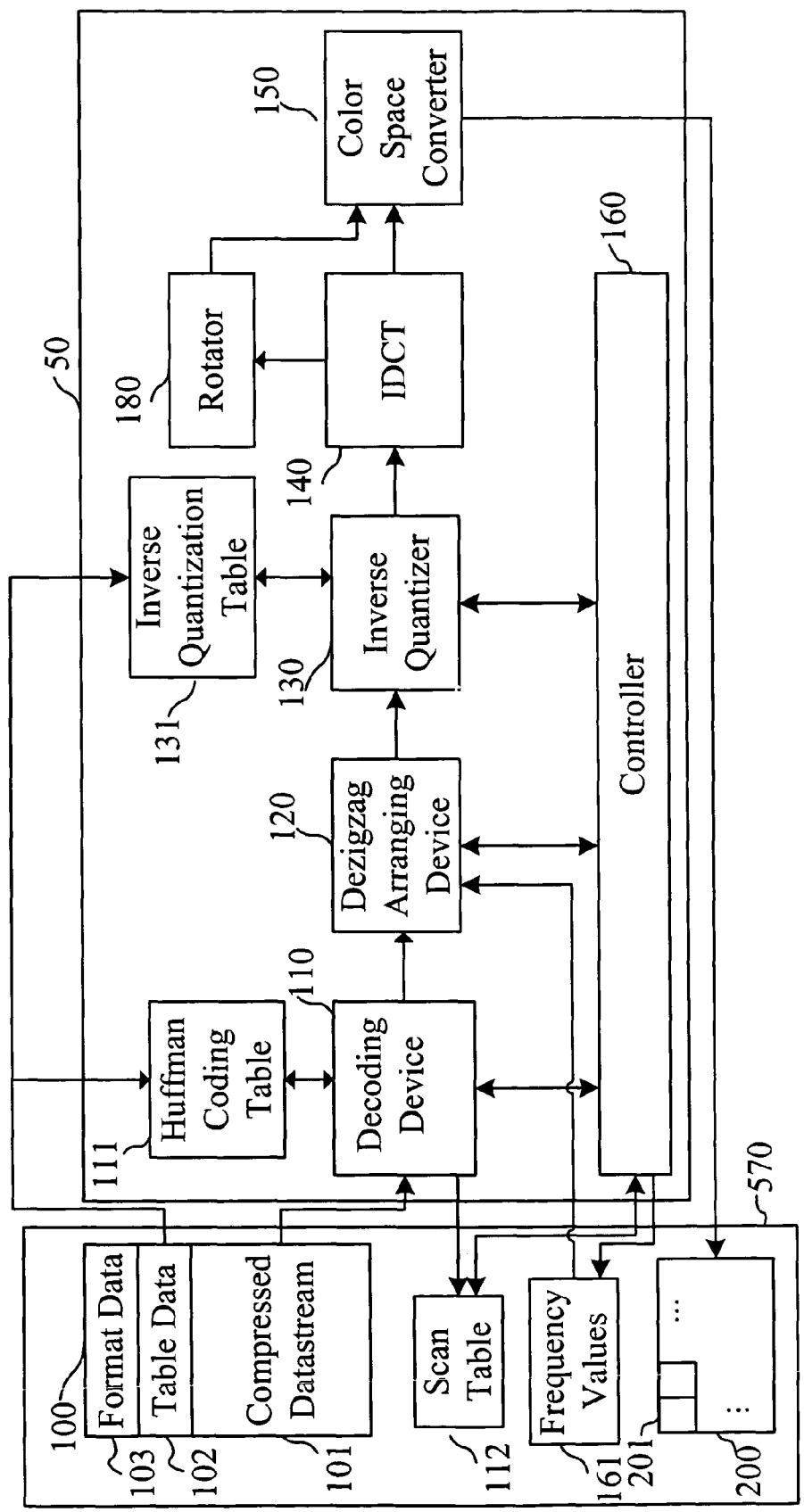
FIG. 5 is a block diagram of a block decoding apparatus capable of decoding and outputting data in a longitudinal direction in accordance with the invention.

FIG. 5 is a block diagram of a block decoding apparatus 50 capable of decoding and outputting data in a longitudinal direction in accordance with the invention, in which an example of JPEG decoding is given for description. In FIG. 5, the JPEG decoding is applied to decode an input compressed image file 100 for obtaining a decompressed image 200 having a plurality of blocks 201. The blocks 201 are arranged in a two-dimensional array, where a block (i, j) indicates a block of i-th row and j-th column of the decompressed image 200, wherein i=0-M, j=0-N, and M, N are integers. Every K (an integer greater than one) blocks form a minimum code unit row (MCUR). The compressed image file 100 has table data 102 and format data 103 that are associated with compressed datastream 101 thereof. The table data 102 has a Huffman coding table 111 and an inverse quantization table 131.

As shown in FIG. 5, the decoding apparatus 50 includes a memory device 570, a decoding device 110, a de-zigzag arranging device 120, an inverse quantizer 130, an inverse discrete cosine transform (IDCT) device 140, a color space converter 150, and a rotator 180.

Figure 1:
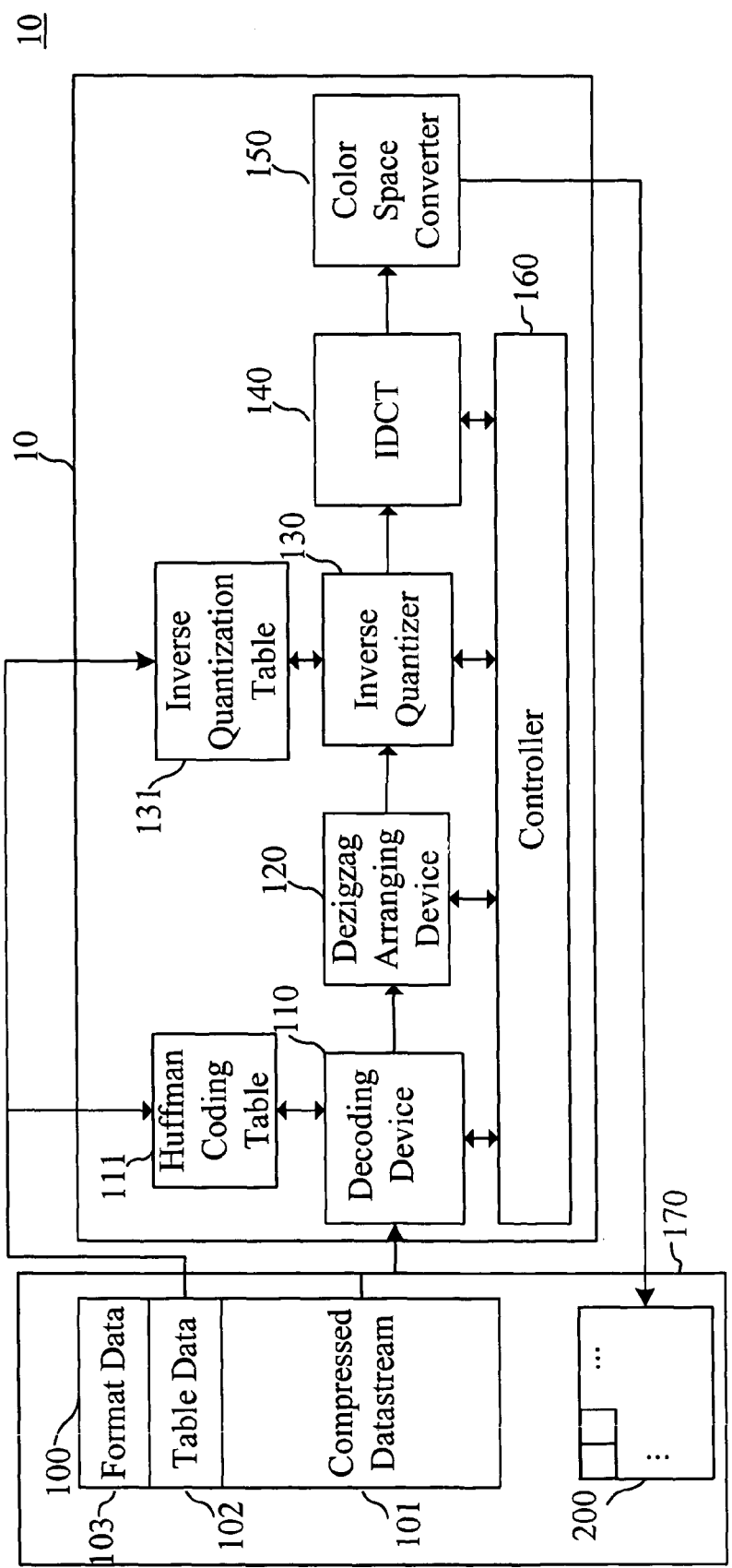
FIG. 1 is a block diagram of a conventional JPEG decoder.
Figure 6:
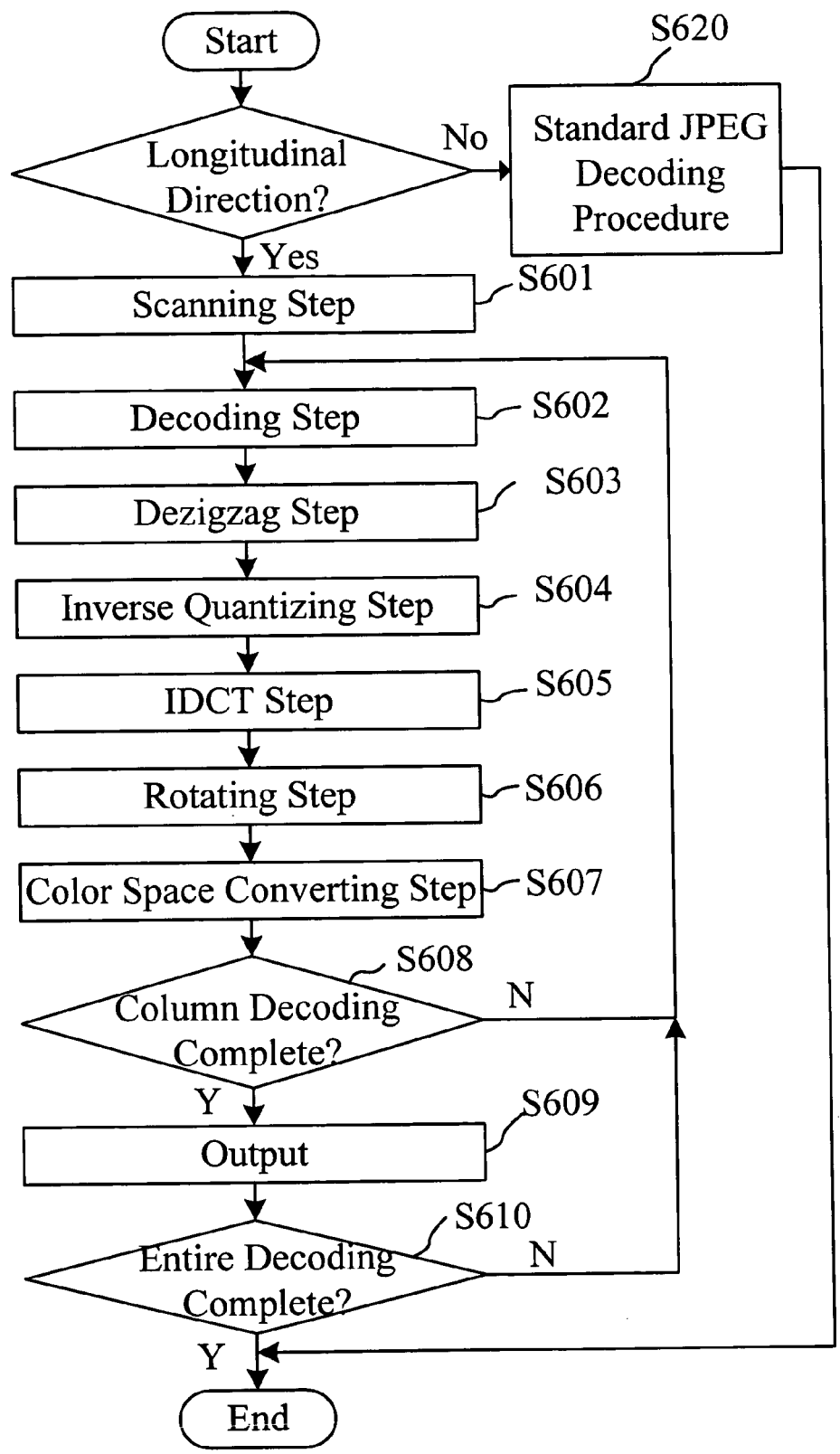
FIG. 6 is a flowchart of a block decoding method capable of decoding and outputting data in a longitudinal direction in accordance with the invention.

FIG. 6 is a flowchart of a block decoding method capable of decoding and outputting data in a longitudinal direction in accordance with the invention. Referring to FIGS. 5 and 6, when the compressed datastream is not decoding and outputting in a longitudinal direction, the devices 110, 120, 130, 140, 150 and 570 can be operated as the conventional JPEG decoder shown in FIG. 1. Thus, the inventive block decoding system can typically decode and output the compressed datastream in a horizontal direction (step S620).

However, when a longitudinal output is selected, the decoding device 110 scans the compressed datastream 101 (step S601), thereby obtaining a scan table 112. The scan table 112 has a start address in the compressed datastream 101 for each MCUR, and DC values corresponding to the K blocks of the MCUR, which are stored in the memory device 570.

Figure 7:
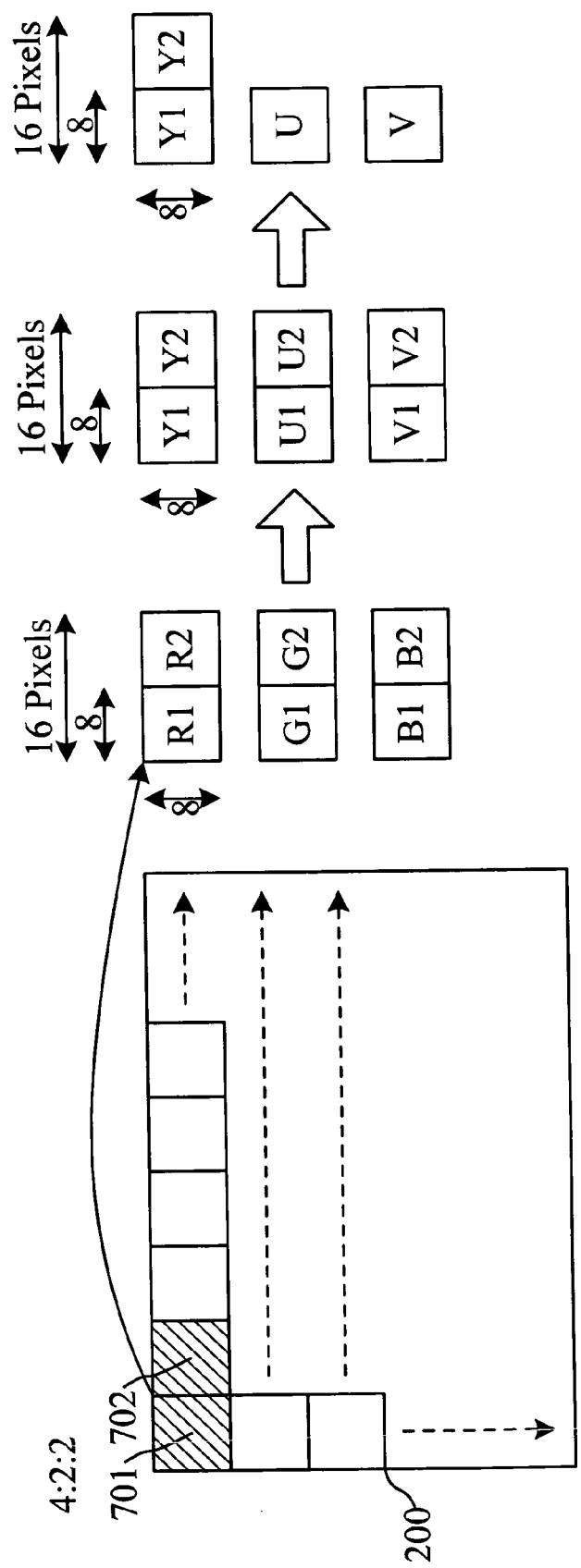
FIG. 7 is a schematic view of a 4:2:2 compression format in an image in accordance with the invention.
Figure 8:
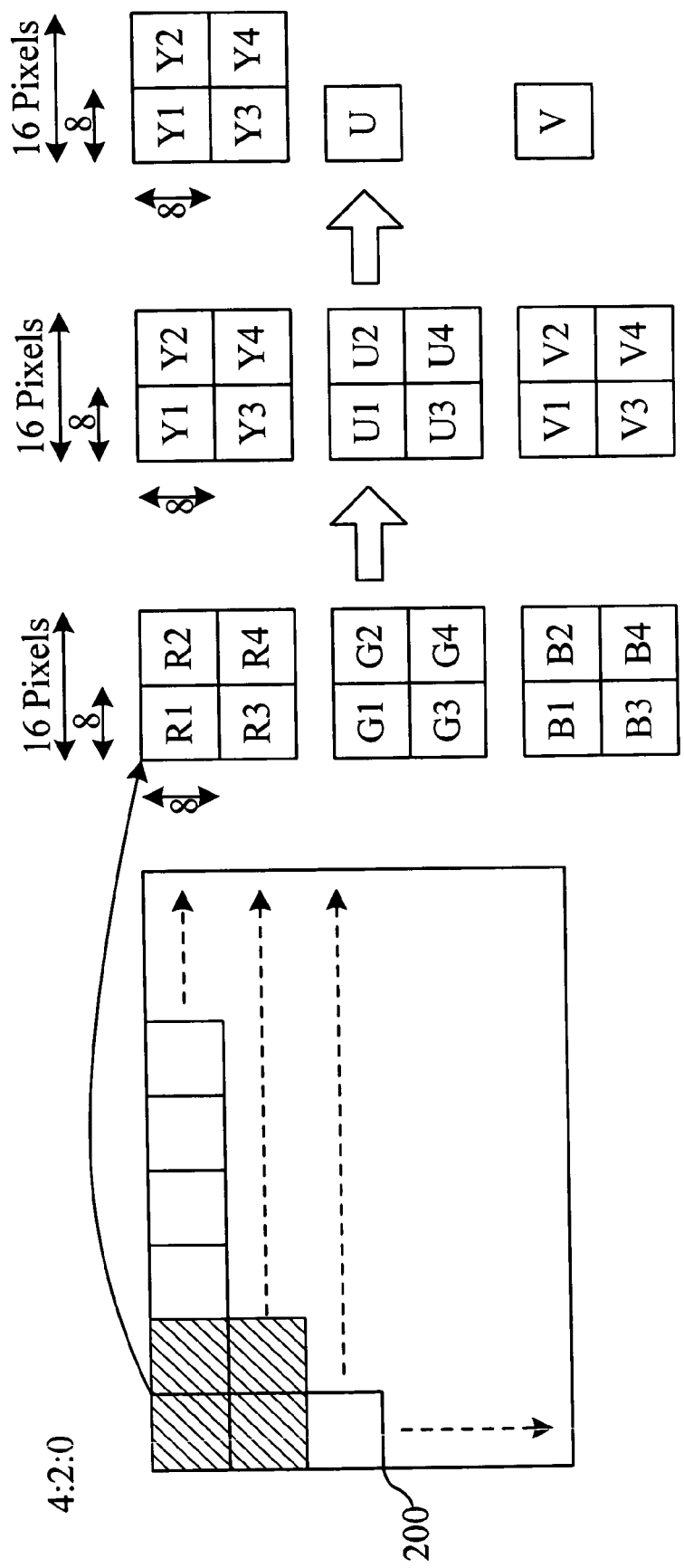
FIG. 8 is a schematic view of a 4:2:0 compression format in an image in accordance with the invention.

FIG. 7 is a schematic view of a 4:2:2 compression format in the image 200. As shown in FIG. 7, notations R1, G1 and B1 indicate the red R, green G and blue B components of block 701, respectively, and notations R2, G2 and B2 indicate the red, green, blue components R, G, B of block 702, respectively. After an RGB to YUV conversion, the components Y, U, V of blocks 701, 702, denoted by Y1, Y2, U1, U2, V1, V2, are obtained. Accordingly, for the 4:2:2 format, a minimum code unit row MCUR1 consists of blocks Y1, Y2, U and V, wherein blocks U and V are obtained by performing a down-sampling in a horizontal direction on U1, U2 and V1, V2. FIG. 8 is a schematic view of a 4:2:0 compression format in an image 200 in accordance with the invention. As shown in FIG. 8, blocks U and V are obtained by performing a down-sampling in a horizontal direction and a vertical direction on U1 to U4 and V1 to V4. Therefore, for the 4:2:0 format, the minimum code unit row MCUR1 consists of blocks Y1, Y2, Y3, Y4, U and V.

The aforementioned scanning first performs a Huffman decoding on the compressed datastream 101 to thereby obtain the scan table 112. FIG. 9 is a schematic diagram of the scan table 112 containing DC values and start addresses. For the 4:2:2 format, as shown in FIG. 9, each MCUR has four DC values DC1 to DC4 corresponding to Y1, Y2, U and V, respectively, and a start address. Similarly, in case of the 4:2:0 format, each MCUR contains six DC values corresponding to Y1, Y2, Y3, Y4, U and V, respectively, and a start address.

The controller 160 of FIG. 5 receives the compressed datastream 101 and controls decoding device 110 to performs the Huffman decoding in a sequence of longitudinal (column) blocks based on the start addresses of the minimum code unit rows (MCUR) obtained from the scan table 112 to thereby obtain the frequency values 161 corresponding to the blocks of each MCUR and store the values 161 in the memory device 570. In this case, the start address in the compressed datastream 101 for each MCUR is known, and accordingly the start address can be used to select blocks for decoding. Thus, the effect of decoding the datastream 101 in the longitudinal sequence is obtained.

In the JPEG standard, the DC values for each block are coded by a differential pulse code modulation (DPCM). When the controller 160 applies the longitudinal sequence in decoding, the accurate DC values corresponding to the blocks of each MCUR cannot be obtained by performing the DPCM with reference to a previous block, and thus the controller 160 uses the scan table 112 to have the accurate DC values.

The de-zigzag arranging device 120 is connected to the memory device 570 in order to re-arrange the frequency values 161 corresponding to the blocks (i, j) of each MCUR (step S603).

Figures 2, 3:
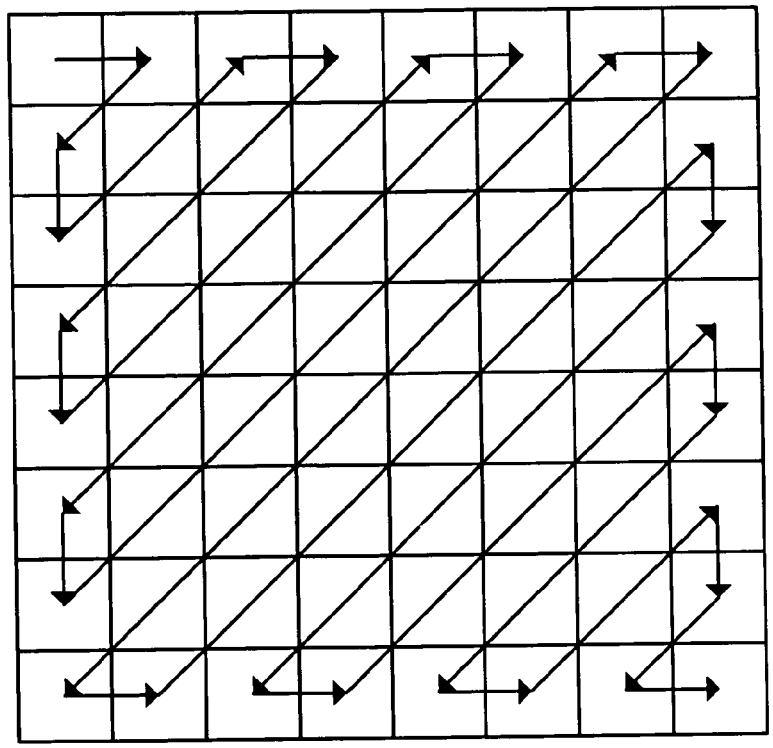
FIG. 2 is a schematic view of a zigzag arrangement in a conventional JPEG decoding.
FIG. 3 is an example of an inverse quantization table for a conventional JPEG decoding.

The inverse quantizer 130 is connected to the de-zigzag arranging device 120 in order to perform an inverse quantization operation on a two-dimensional block (i, j) of the MCUR in accordance with the inverse quantization table 131 of FIG. 3 to thus obtain a two-dimensional inverse quantization block (i, j) (step S604).

The IDCT device 140 is connected to the inverse quantizing device 130 in order to convert the two-dimensional inverse quantization block (i,j) of the MCUR from frequency domain to spatial domain (step S605).

Figure 4:
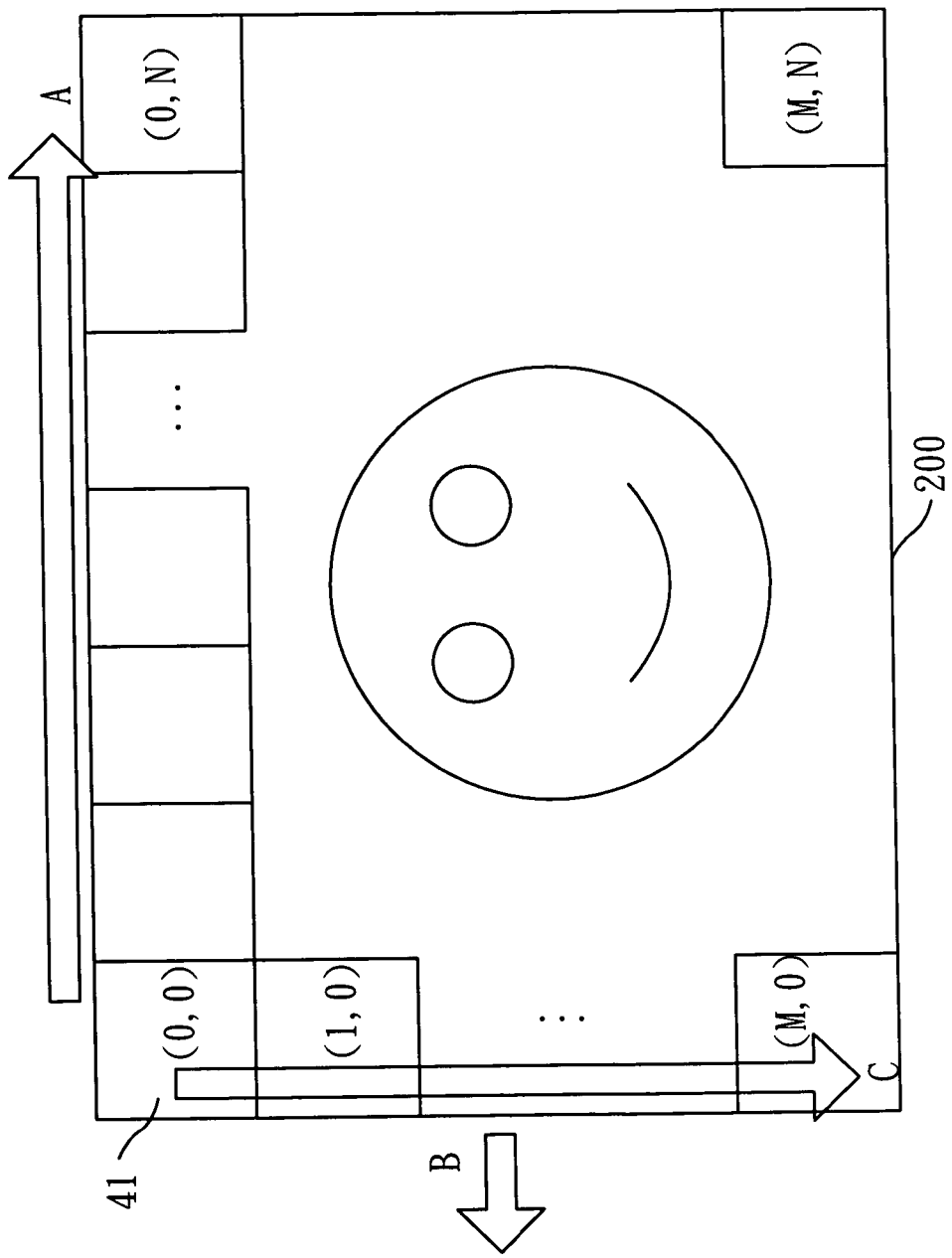
FIG. 4 is a schematic view of a conventional decompressed image.
Figure 11:
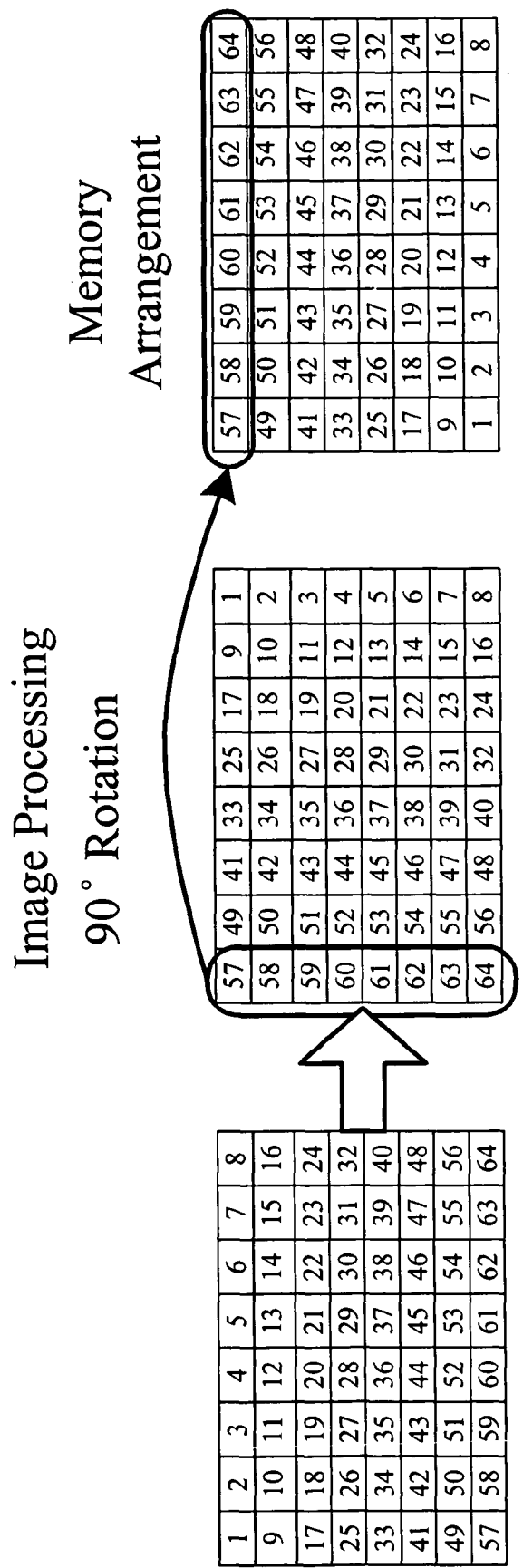
FIG. 11 is a schematic view of a 90-degree rotation operation performed by a rotator in accordance with the invention.

The rotator 180 is connected to the IDCT device 140 in order to perform a rotation operation on the two-dimensional spatial domain blocks (i, j) of the MCUR (step S606). The rotator 180 uses a rotation table (not shown) to perform the rotation operation on a two-dimensional spatial domain block (i, j). The rotation operation is performed by a rotating an angle of 0°, 90°, 180° or 270°. FIG. 10 is a schematic view of a zero-degree rotation operation performed by the rotator 180. As shown in FIG. 10, for printing in a direction A (horizontal) shown in FIG. 4, the rotator 180 re-arranges the two-dimensional spatial domain block (i, j) and stores the block re-arranged in the memory device 570 for further operation. FIG. 11 is a schematic view of a 90-degree rotation operation performed by the rotator 180. As shown in FIG. 11, for printing in a direction A (horizontal) of FIG. 4, the rotator 180 re-arranges the two-dimensional spatial domain block (i, j) after the 90-degree rotation operation is performed, and stores the blocks re-arranged in the memory device 570 for further operation. Likewise, the 180-degree rotation operation and 270-degree rotation operation are performed by the rotator 180, which are known to those skilled in the art, and thus a detailed description is deemed unnecessary.

As cited, the down-sampling operation in coding is performed in the horizontal direction for obtaining the Y, U, V blocks with the 4:2:2 format. In this case, in decoding, the rotator 180 performs an up-sampling operation in the vertical direction after the rotation operation, and accordingly expands the four blocks Y1, Y2, U and V decoded to the six blocks Y1, Y2, U1, U2, V1 and V2. In addition, the down-sampling operation in coding is performed in the horizontal and vertical directions for obtaining the Y, U, V blocks with the 4:2:0 format. In this case, in decoding, the rotator 180 performs the up-sampling operation in the vertical and horizontal directions.

The color space converter 150 is connected to the IDCT device 140 and the rotator 180 in order to perform a color conversion on the two-dimensional spatial block (i, j) of the MCUR from YCbCr to RGB format, thereby obtaining the block (i, j) of a decompressed image similar to the original image (step S607).

Figure 12:
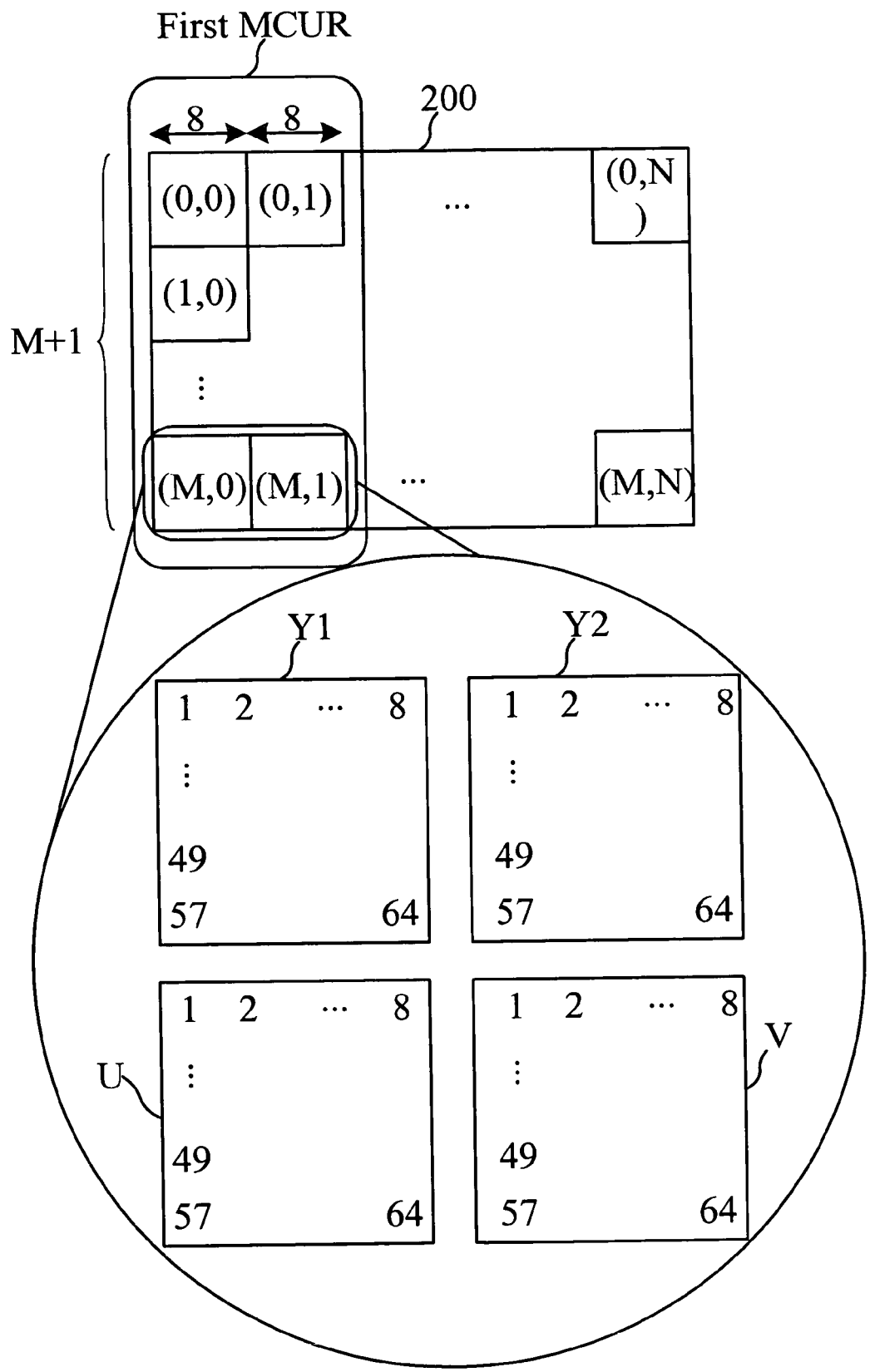
FIG. 12 is a schematic view of a minimum code unit row (MCUR) of a decompressed image of 4:2:2 compression format temporarily stored in a memory device in accordance with the invention.

Step 608 determines if the blocks of a column of MCURs are decoded; if not, steps S602 to S607 are executed to perform the decoding operation on a next MCUR of the column; and if yes, the column of MCURs decoded is output (step S609), and the decoding operation is performed on a next column of MCURs. This process is repeated until the decoding operation is completely performed and the decompressed image is obtained FIG. 12 is a schematic view of the blocks (i, j) of a minimum code unit row (MCUR) of the decompressed image 200 temporarily stored in the memory device 570. Each block (i, j) of the MCUR has plural (K) blocks, and each block has 64 pixels (numbered 1 to 64). For the 4:2:2 format, the MCUR consists of four blocks Y1, Y2, U and V, as shown in FIG. 12. Namely, a column of MCURs corresponds to 16 column of pixels of the decompressed image 200. The memory device 570 only requires temporarily storing a column of MCURs of the decompressed image 200 in printing. For the Y, U, V blocks with the 4:2:2 format, each column of MCURs contains 16 column of the decompressed image 200, and accordingly only a memory of (M+1)×8×16×3 bytes is required to temporarily store the 16 columns of the decompressed image 200 for longitudinally outputting the decompressed image.

In view of the foregoing, it is known that the invention scans the compressed datastream to thereby obtain a start address in the compressed datastream for each MCUR of the decompressed image, such that the decoding device 110 can longitudinally perform the Huffman decoding on the blocks. Subsequently, the blocks decoded are processed by the de-zigzag arrangement, the inverse quantization, the IDCT and the rotation to thus obtain blocks rotated by 90 degrees. Because the direction of the decoding coincides with that of the printout, only temporarily storing a row of MCUR of image data in the decompressed image is required in printing, which relatively reduces the required memory. In addition, the processed format of the compressed datastream is the JPEG format, and thus no additional information is required. Further, the decoding is compatible with the JPEG standard, which can be integrated with a typical JPEG decoder, thereby supporting the longitudinal and horizontal decoding.

Although the present invention has been explained in relation to its preferred embodiment, it is to be understood that many other possible modifications and variations can be made without departing from the spirit and scope of the invention as hereinafter claimed.

What is claimed is:

1. A block decoding method for decoding and outputting data in a longitudinal direction, which decodes an input compressed datastream to obtain a decompressed image with a plurality of blocks in rows and columns, each said block consisting of pixels in a two-dimensional arrangement, and every K said blocks forming a minimum code unit row (MCUR), where K is an integer greater than one, the block decoding method comprising:
- a scanning step, which scans the compressed datastream to thus obtain a start address in the compressed datastream for each said MCUR, and direct current values corresponding to the K blocks of the MCUR;
- a decoding step, which longitudinally performs a Huffman decoding on the blocks in accordance with the start address of MCUR, thereby obtaining frequency values corresponding to the K blocks of the MCUR;
- a de-zigzag arranging step, which re-arranges the frequency values into a de-zigzag sequence;
- an inverse quantizing step, which performs an inverse quantization operation on the frequency values in accordance with an inverse quantization table;
- an inverse discrete cosine transform step, which converts the frequency values of the K blocks from frequency domain to spatial domain after the inverse quantization operation to thus obtain spatial domain coefficients corresponding to the K blocks of the MCUR; and
- a rotating step, which performs a rotation operation on the spatial domain coefficients.

2. The method as claimed in claim 1, further comprising an up-sampling step, which performs an up-sampling operation on the spatial domain coefficients after the rotation operation.

3. The method as claimed in claim 2, further comprising a color space converting step, which performs a color conversion on the spatial domain coefficients after the up-sampling operation.

4. The method as claimed in claim 3, wherein the color space converting step converts the decompressed image from YCbCr format to RGB format.

5. The method as claimed in claim 4, wherein the decoding step to the color space converting step are repeatedly executed to longitudinally decode all blocks of the input compressed datastream.

6. The method as claimed in claim 1, wherein the input compressed datastream is produced by compressing the data in accordance with a JPEG standard.

7. The method as claimed in claim 1, wherein the rotating step performs the rotation operation with a rotating angle of 0, 90, 180 or 270 degrees.

8. A block decoding apparatus for decoding and outputting data in a longitudinal direction, which decodes an input compressed datastream to thus obtain a decompressed image with a plurality of blocks in rows and columns, each said block consisting of pixels in a two-dimensional arrangement, and every said K blocks forming a minimum code unit row (MCUR), where K is an integer greater than one, the block decoding apparatus comprising:
- a memory device, which stores the input compressed datastream;
- a decoding device, connected to the memory device, for receiving and scanning the compressed datastream to thus obtain a start address in the compressed datastream for each said MCUR and direct current values corresponding to the K blocks of the MCUR, then the start address and the direct current values for the MCUR being stored in the memory device;
- a controller, for controlling decoding device to perform a Huffman decoding on the K blocks of the MCUR longitudinally in accordance with the start address and the direct current values stored, thereby obtaining frequency values corresponding to the K blocks of the MCUR;
- a de-zigzag arranging device, connected to the decoding device and the memory device, for re-arranging the frequency values into a de-zigzag sequence;
- an inverse quantizer, connected to the de-zigzag arranging device, for performing an inverse quantization operation on the frequency values re-arranged in accordance with an inverse quantization table;
- an inverse discrete cosine transform device, connected to the inverse quantizing device, for converting the frequency values of the K blocks of the MCUR from frequency to spatial domain after the inverse quantization operation to thus obtain spatial domain coefficients corresponding to the K blocks of the MCUR; and
- a rotator, connected to the inverse discrete cosine transform device and the memory device, for performing a rotation operation and an up-sampling operation on the spatial domain coefficients.

9. The apparatus as claimed in claim 1, further comprising a color space converter, connected to the memory device, for performing a color conversion on the spatial domain coefficients after the up-sampling operation.

10. The apparatus as claimed in claim 9, wherein the color conversion converts the decompressed image from YCbCr format to RGB format.

11. The apparatus as claimed in claim 8, wherein the input compressed datastream is produced by compressing the data in accordance with a JPEG standard.

12. The apparatus as claimed in claim 8, wherein the rotator performs the rotation operation with an angle of 0, 90, 180 or 270 degrees.

* * * * *